United States Patent [19]

Martin et al.

[11] Patent Number: 4,948,830

[45] Date of Patent: Aug. 14, 1990

[54] BROAD TEMPERATURE CAPABILITY ELASTOMER

[75] Inventors: Jon W. Martin, Los Alamitos; Leslye M. Fraser, Inglewood, both of Calif.

[73] Assignee: The United States of America as represented by the Secretary of the Air Force, Washington, D.C.

[21] Appl. No.: 254,628

[22] Filed: Oct. 7, 1988

[51] Int. Cl.$^5$ .................. C08L 27/20; C08L 27/18; C08L 27/16
[52] U.S. Cl. ...................... 524/462; 525/199
[58] Field of Search .................. 525/199; 524/462

[56] References Cited

U.S. PATENT DOCUMENTS

| | | | |
|---|---|---|---|
| 2,992,988 | 7/1961 | Dipner | 525/199 |
| 3,372,136 | 3/1968 | Kometani | 524/462 |
| 4,472,557 | 9/1984 | Kawashima et al. | 525/276 |
| 4,487,882 | 12/1984 | Ueta et al. | 524/505 |
| 4,603,175 | 7/1986 | Kawachi et al. | 525/276 |

FOREIGN PATENT DOCUMENTS 190241  8/1987  Japan ................... 525/199

*Primary Examiner*—John C. Bleutge
*Assistant Examiner*—David Buttner
*Attorney, Agent, or Firm*—Bobby D. Scearce; Donald J. Singer

[57] ABSTRACT

An improved fluoroelastomer composition for hydraulic seals is described which comprises a ternary mixture of a polymer including alternate fluorocarbon and hydrocarbon components joined together, EPDM (a random terpolymer of ethylene, propylene and a diene), and CTFE (an oligomer of chlorotrifluoroethylene) in a preferred weight ratio of about 85:15:10.

2 Claims, No Drawings

BROAD TEMPERATURE CAPABILITY ELASTOMER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to fluoroelastomer compositions, and more particularly to improved broad temperature capability fluoroelastomer compositions of particular application in hydraulic seals in aircraft and missiles.

Aircraft and missile systems have sealed hydraulic systems which may be subjected to a wide range of environmental conditions and must be capable of storage and operation in very cold environments and of withstanding hot operating temperatures. Hydraulic seals in such systems must therefore perform over a wide temperature range. For example, one missile system has anticipated cold storage requirements of about −65° F. Existing nitrile seals can function at temperatures of about −65° to 275° F. and existing fluoroelastomer seals can function at about 0° to 600° F. However, no existing seal can function satisfactorily near both extremes.

The invention solves or substantially reduces in critical importance problems with existing seal types as suggested above by providing an improved fluoroelastomer seal composition having wide temperature application and excellent low temperature properties. The preferred embodiment of the invention comprises a ternary mixture of a polymer including alternate fluorocarbon and hydrocarbon components joined together, EPDM (a random terpolymer of ethylene, propylene and a diene), and CTFE (an oligomer of chlorotrifluoroethylene) in the approximate ratio of 85:15:10. This composition is compatible with a wide range of hydrocarbon based hydraulic fluids including MIL-H-27601 hydraulic fluid a highly refined paraffin oil commonly used for wide temperature application within military systems.

It is therefore a principal object of the invention to provide an improved fluoroelastomer composition.

It is another object of the invention to provide an improved broad temperature capability fluoroelastomer composition.

It is another object of the invention to provide a fluoroelastomer seal composition having excellent low temperature properties.

It is yet another object of the invention to provide improved broad temperature applicable hydraulic seals of novel fluoroelastomer composition.

These and other objects of the invention will become apparent as the detailed description of representative embodiments proceeds.

SUMMARY OF THE INVENTION

In accordance with the foregoing principles and objects of the invention, an improved fluoroelastomer composition for hydraulic seals is provided which comprises a ternary mixture of a polymer including alternate fluorocarbon and hydrocarbon components joined together, EPDM (a random terpolymer of ethylene, propylene and a diene), and CTFE (an oligomer of chlorotrifluoroethylene) in a preferred weight ratio of about 85:15:10.

DETAILED DESCRIPTION

The invention comprises improved fluoroelastomer compositions having surprisingly good low temperature properties and broad temperature range application. The compositions of the invention comprise a ternary mixture of a polymer including alternate fluorocarbon and hydrocarbon components joined together, EPDM and CTFE. As described more fully below, a preferred weight ratio of the three components was found to be about 85:15:10. Examples of fluorocarbon-hydrocarbon polymers useful in the formulation of compositions within the scope of the teachings herein and of the appended claims include an alternate copolymer of tetrafluoroethylene and propylene (available as the commercial product Aflas TM, Asahi Glass Co.) and co- and ter-polymers of tetrafluoroethylene and vinylidine fluoride and hexafluoropropene (e.g. Viton TM, DuPont, and Fluorel TM, 3M Company). EPDM is a random terpolymer of ethylene, propylene and a diene, and CTFE is an oligomer of chlorotrifluoroethylene. In formulating the fluoroelastomer compositions of the invention generally, the fluorocarbon-hydrocarbon polymer and the EPDM components are first thoroughly blended and vulcanized at a temperature of about 350° F. After the vulcanizing step and oven post cure of about 4 hours at 350° F. in air, CTFE is swelled into the vulcanizate at a temperature of about 75° F. Alternatively, the completely compounded mixture may be cured using conventional cure techniques in the temperature range about 275–400° F. According to the invention, all three components must be present, a fluoroelastomer continuous phase, an EPDM dispersed phase and the CTFE. However, other standard compounding ingredients, including carbon black, silica, peroxide and the like, as would occur to the skilled artisan, may be added to the formulation to improve engineering properties.

The ternary compositions so obtained have excellent high temperature properties as shown by substantially no differential scanning calorimeter deflection under 600° F. The compositions further demonstrated unexpected excellent low temperature properties below that of any previously reported fluoroelastomer.

Low temperature stiffness measurements were made on various candidate fluoroelastomers using the $TR_{10}$ (ASTM D1329) method for comparison with the compositions of the invention. According to this method the sample is stretched and clamped into the tester and immersed into a cold bath (e.g., alcohol and dry ice). When the sample freezes, it is unclamped and the bath is allowed to slowly warm up. The length of the stretched sample is monitored and plotted as a function of bath temperature. At some temperature (T), the sample will have recovered (R) 10% of the original amount of stretching ($TR_{10}$). For practical purposes, the $TR_{10}$ temperature may be loosely approximated as the temperature at which the sample "melts". Industry experience has shown that a seal will normally function satisfactorily at about 20° F. below the $TR_{10}$ temperature.

Compositions and $TR_{10}$ values for certain formulations in demonstration of the invention are given in the following table:

| Compositions and $TR_{10}$ Values for Experimental Formulations | | | | | | |
|---|---|---|---|---|---|---|
| | Parts by Weight | | | | | |
| Component | (a) | (b) | (c) | (d) | (e) | (f) |
| Aflas 150P | 100 | 100 | 100 | 100 | 100 | — |
| Nordel 1040 | — | — | 33 | 33 | 33 | — |
| Viton GLT | — | — | — | — | — | 100 |
| SRF Carbon | 23 | 23 | 37 | 37 | 37 | — |
| Diak #7 | 5 | 5 | 5 | 5 | 5 | 4 |
| Vulcup R | 1.0 | 1.0 | 1.6 | 1.6 | 1.6 | — |
| MT Carbon | — | — | — | — | — | 30 |
| Ca(OH)$_2$ | — | — | — | — | — | 4 |
| Lupersol 101 | — | — | — | — | — | 2 |
| Total Parts | 129.0 | 129.0 | 176.6 | 176.6 | 176.6 | 140.0 |
| Cure-Min/°F. | 30/350 | 30/350 | 30/350 | 30/350 | 30/350 | 10/350 |
| Vac Post-cure Hrs/°F. | 4/350 | 4/350 | 4/350 | 4/350 | 4/350 | 24/450* |
| Soaked In | CTFE | Mil-H-27601 | Mil-H-27601 | CTFE | CTFE & Mil-H-27601 | CTFE |
| $TR_{10}$ (°F.)** | +39 | +37 | +22 | −46 | −45.5 | −29 |

*Air oven, not vacuum.
**Average of two runs.

As seen in the foregoing table, the compositions (a)-(c) with the respective composition ratios comprising, Aflas/CTFE (100:15), Aflas/MIL-H-27601 (paraffin oil usable here as a plasticizer for rubber compounds) (100:15), and Aflas/EPDM/MIL-H-27601 (100:33:15) had high $TR_{10}$ temperatures of +39° F., +37° F. and +22° F. The Viton GLT (conventional broad temperature fluoroelastomer comprising a random polymer of vinylidine fluoride, hexafluoropropene and a fluoroalkyl ether) and CTFE (100:15) formulation had a $TR_{10}$ temperature of −29° F. The Aflas/EPDM/CTFE (85:15:10) formulations of the invention, with or without MIL-H-27601 with $TR_{10}$ temperatures of about −46° F. will have low temperature usefulness near or below about −66° F.

The invention therefore provides an improved fluoroelastomer composition having broad temperature range capability with particular utility in hydraulic seals. It is understood that modifications to the invention as described may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. A fluoroelastomer composition having wide temperature application and excellent low temperature flexibility comprising a ternary mixture of:
   (a) a polymer comprising a material combination selected from the group consisting of tetrafluoroethylene and propylene, tetrafluoroethylene and vinylidine fluoride, tetrafluoroethylene and hexafluoropropene, vinylidine fluoride and hexafluoropropene, and tetrafluoroethylene and vinylidine fluoride and hexafluoropropene;
   (b) a random terpolymer of ethylene, propylene and a diene; and
   (c) an oligomer of chlorotrifluoroethylene; said polymer, random terpolymer and oligomer being in the approximate weight ratio of 85:15:10.

2. A hydraulic seal having broad temperature applications comprising:
   (a) a fluoroelastomer composition including a ternary mixture of
      (i) a polymer comprising a material combination selected from the group consisting of tetrafluoroethylene and propylene, tetrafluoroethylene and vinylidine fluoride, tetrafluoroethylene and hexafluoropropene, vinylidine fluoride and hexafluoropropene, and tetrafluoroethylene and vinylidine fluoride and hexafluoropropene,
      (ii) a random terpolymer of ethylene, propylene and a diene, and
      (iii) an oligomer of chlorotrifluoroethylene;
   (b) wherein said polymer, terpolymer and oligomer are in the approximate weight ratio of 85:15:10.

* * * * *